(No Model.)
I. TOWNSEND.
TRACTION ENGINE.
No. 482,599. Patented Sept. 13, 1892.
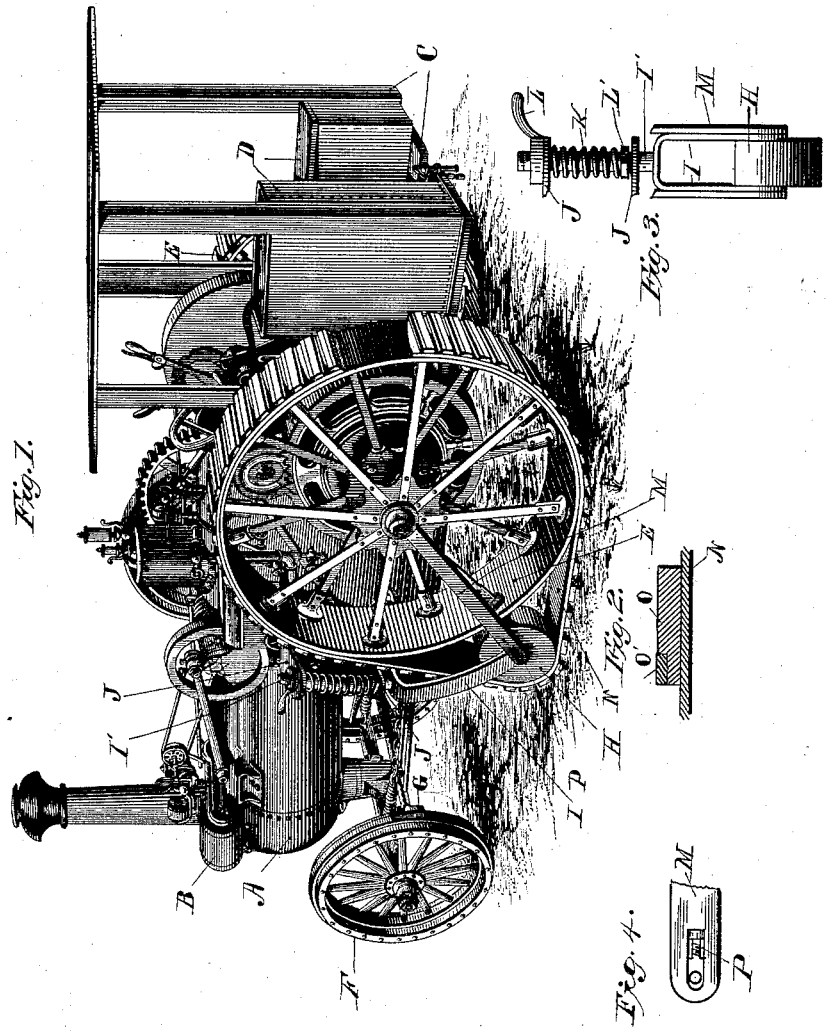
Witnesses:
Clement F. Wood
E. C. Reynolds
Inventor:
Israel Townsend.
By Niles & Greene
Attorneys

UNITED STATES PATENT OFFICE.

ISRAEL TOWNSEND, OF PORTSMOUTH, VIRGINIA.

TRACTION-ENGINE.

SPECIFICATION forming part of Letters Patent No. 482,599, dated September 13, 1892.

Application filed December 17, 1891. Serial No. 415,393. (No model.)

*To all whom it may concern:*

Be it known that I, ISRAEL TOWNSEND, a citizen of the United States, residing at Portsmouth, in the county of Norfolk and State of Virginia, have invented certain new and useful Improvements in Traction-Engines; and I do hereby declare the following to be a full, clear, and exact description of the invention, such as will enable others skilled in the art to which it appertains to make and use the same.

This invention relates to engines for use in the fields or upon wagon-roads, and especially to means for increasing traction and for preventing the driving-wheels from sinking or cutting into soft or sandy earth. It is illustrated in the accompanying drawings, in which—

Figure 1 is a perspective view of the entire apparatus, including many parts that are not of my invention. Figs. 2, 3, and 4 are detail views.

In the figures, A is a boiler, and B an engine proper supported thereon.

C is a covered cab at the rear, from which the operator controls the movement and operation of the entire machine. The cab carries water and fuel in suitable receptacles D and the whole is supported upon driving-wheels E and swiveled or guiding wheels F, the latter provided with a brake G. The peripheries of the driving-wheels are smooth and very broad, and in front of each and in its plane is a pulley H, normally resting upon the same horizontal plane as the driving-wheel and mounted in a curved guiding support I I', concentric with the driving-wheel and consisting of a fork I and a shank or shaft I'. The latter slides in bearings J, secured to the boiler or other fixed parts. Between the bearings J a spring K is coiled about the shaft, which is threaded and provided with a nut L, resting upon the upper bearing. The pulley is further held in links M, pivotally connecting each end of its axle with the axle of the driving-wheel. The links permit the pulley to swing about the center of the driving-wheel, but keep it at a fixed distance therefrom. The nut L prevents its falling below its normal position, and the nut L', resting against the lower end of the spring, allows it to rise only when the moving force is sufficient to compress the spring. Evidently the tension of the spring used may be varied by turning the nut L', and by like manipulation of the nut L the pulley may be set at any height. An endless traction-belt N, of suitable material, passes around both driving-wheel and pulley and normally rests upon the ground for a distance about equal to the radius of the driving-wheel. It has bars or cleats O fixed to its outer face, and the front edges of these are shod with slightly-projecting steel plates O'. If at any time the use proposed makes the belt unnecessary, it may be readily removed, and with it the pulley and its supports, and if the traction-belt stretches or at any time becomes loose in use it may be tightened by forcing the pulley outward in slots P in the links, suitable devices being provided for that purpose. The forward wheels bear little weight, and hence no special devices are needed upon them.

It is to be observed that the additions to an ordinary traction-engine which my invention requires are extremely simple and inexpensive, and that breakage in passing over stones and the like is avoided, for the pulley rises before the strain reaches the breaking point.

While the engine is especially adapted for plowing it serves as a stationary engine for thrashing, &c., if the traction-belt be removed and the smooth driving-wheel be kept out of contact with the earth and used as a driving-pulley.

What I claim is—

1. The combination, with the driving-wheel, of an endless traction-belt passing around the same and lying in the plane of its lowest contact-line for some distance in front of that line and devices offering yielding resistance to the rising of the belt above that plane.

2. The combination, with an engine-driving wheel, of a belt-pulley in its plane and normally resting upon the same horizontal plane, a yielding support or bearing for said pulley, and a traction-belt passing around both the drive-wheel and pulley.

3. The combination, with the driving-wheel, of the pulley in front thereof, mounted in links swinging upon the axle of the driving-wheel, and a traction-belt passing around both the driving-wheel and pulley.

4. The combination, with the driving-wheel, the links swinging about its axis, and the pulley mounted in the free ends of said links, of the traction-belt passing around both the driving-wheel and pulley and a spring offering yielding resistance to the pulley's swinging upward from its normal position.

5. The combination, with the driving-wheel, of a pulley in the same plane mounted to swing about the wheel's center, an endless traction-belt passing around both wheel and pulley, and a spring offering yielding resistance to lifting the pulley from the plane upon which the driving-wheel rests.

6. The combination, with the driving-wheel, of the pulley in the plane of the same, the pulley-guiding fork having the curved shaft sliding in fixed bearings, the nut resisting the sliding of said shaft in one direction, the spring coiled about the shaft and offering yielding resistance to its sliding in a contrary direction, and a traction-belt passing around both pulley and driving-wheel.

7. The combination, with the driving-wheel, of the pulley in the same plane swinging in links mounted upon the axle of the driving-wheel, the guiding-fork and curved shaft sliding in the fixed bearings, the spring resisting lifting of the pulley from the ground, and a traction-belt passing around both pulley and wheel.

8. The combination, with the pulley, the guiding-fork having the shaft sliding in fixed bearings, and the spring coiled about said shaft below one of said bearings, of the nut working upon said shaft to compress the spring and vary its tension.

9. The combination, with the driving-wheel, links pivoted upon its axle, and a pulley mounted in the free ends of said links, of devices for varying the distance of the pulley from said axle and a traction-belt passing around both the driving-wheel and pulley.

10. The combination of the endless belt, the transverse bars or cleats fixed thereto, and the slightly-projecting steel plates fixed along the front edges of said cleats, substantially as set forth.

In testimony whereof I affix my signature in presence of two witnesses.

ISRAEL TOWNSEND.

Witnesses;
WALLACE GREENE,
J. WM. HENRY.